(12) United States Patent
Mualla

(10) Patent No.: US 10,395,125 B2
(45) Date of Patent: Aug. 27, 2019

(54) OBJECT DETECTION AND CLASSIFICATION WITH FOURIER FANS

(71) Applicant: SMR Patents S.A.R.L., Luxembourg (LU)

(72) Inventor: Firas Mualla, Stuttgart (DE)

(73) Assignee: SMR PATENTS S.A.R.L., Luxembourg (LU)

( * ) Notice: Subject to any disclaimer, the term of this patent is extended or adjusted under 35 U.S.C. 154(b) by 241 days.

(21) Appl. No.: 15/287,554

(22) Filed: Oct. 6, 2016

(65) Prior Publication Data

US 2018/0101738 A1    Apr. 12, 2018

(51) Int. Cl.
| | |
|---|---|
| *G06K 9/00* | (2006.01) |
| *B60Q 9/00* | (2006.01) |
| *B60R 1/00* | (2006.01) |
| *G06K 9/46* | (2006.01) |

(Continued)

(52) U.S. Cl.
CPC ......... *G06K 9/00805* (2013.01); *B60Q 9/008* (2013.01); *B60R 1/00* (2013.01); *G06K 9/00791* (2013.01); *G06K 9/00818* (2013.01); *G06K 9/4604* (2013.01); *G06K 9/4671* (2013.01); *G06K 9/6218* (2013.01); *G06K 9/6256* (2013.01); *G06K 9/6267* (2013.01); *H04N 7/183* (2013.01); *B60R 2300/8093* (2013.01)

(58) Field of Classification Search
CPC .... G06K 9/6269; G06K 9/4671; G06K 9/628; G06K 9/3233; G06K 9/00805; G06K 9/6267

See application file for complete search history.

(56) References Cited

U.S. PATENT DOCUMENTS

| | | | |
|---|---|---|---|
| 6,285,393 | B1 | 9/2001 | Shimoura et al. |
| 7,038,577 | B2 | 5/2006 | Pawlicki et al. |
| 8,140,226 | B2 | 3/2012 | Wagner et al. |

(Continued)

FOREIGN PATENT DOCUMENTS

| | | |
|---|---|---|
| CN | 104185009 A | 12/2014 |
| CN | 104210424 A | 12/2014 |

(Continued)

OTHER PUBLICATIONS

Burl et al., A probabilistic approach to object recognition using local photometry and global geometry, Computer VisionECCV98, 628-41 (1998).

(Continued)

*Primary Examiner* — Obafemi O Sosanya
(74) *Attorney, Agent, or Firm* — Holzer Patel Drennan

(57) ABSTRACT

An object detection and classification system includes at least one image sensor mounted on a vehicle and configured to capture an image of a portion of the environment surrounding the vehicle. The image may be stored and analyzed to detect and classify objects visible in the captured image. Keypoints are extracted from the image and evaluated according to a feature function. A new descriptor function depending on the distance in complex space between a query point and the keypoints in the image and on the feature value of the keypoints may be sampled to produce a sample value. The sample value may trigger a signal to the operator of the vehicle to respond to the object if the sample value classifies the object as satisfying a potential hazard condition.

14 Claims, 5 Drawing Sheets

(51) Int. Cl.
*G06K 9/62* (2006.01)
*H04N 7/18* (2006.01)

(56) References Cited

U.S. PATENT DOCUMENTS

| | | | |
|---|---|---|---|
| 8,446,468 | B1 | 5/2013 | Medioni et al. |
| 9,230,165 | B2 | 1/2016 | Guan |
| 9,258,564 | B2 | 2/2016 | Pau |
| 2005/0223031 | A1 | 10/2005 | Zisserman et al. |
| 2009/0157268 | A1 | 6/2009 | Chiba et al. |
| 2010/0079481 | A1 | 4/2010 | Zhang et al. |
| 2010/0201820 | A1 | 8/2010 | Lopota et al. |
| 2011/0158510 | A1* | 6/2011 | Aguilar .............. G06K 9/00718 382/159 |
| 2013/0251194 | A1* | 9/2013 | Schamp .................... G06T 7/11 382/103 |
| 2014/0111647 | A1 | 4/2014 | Atsmon et al. |
| 2014/0200759 | A1* | 7/2014 | Lu .......................... B60D 1/245 701/28 |
| 2016/0042253 | A1 | 2/2016 | Sawhney et al. |

FOREIGN PATENT DOCUMENTS

| | | |
|---|---|---|
| EP | 2619728 A1 | 7/2013 |
| EP | 3008694 A1 | 7/2016 |

OTHER PUBLICATIONS

Fergus, R., Visual Object Category Recognition, Ph. D thesis, U. of Oxford (2005).
Fischler, M. A., Elschlager, R. A., The representation and matching of pictoral structures. IEEE Transactions on Computers, C-22(1):67-92 (1973).
Leibe, et al., Combined object categorization and segmentation with an implicit shape model, ECCV Workshop on Statistical Learning in Computer Vision, pp. 17-32.
Weber, M., Unsupervised Learning of Models for Object Recognition, Ph. D. thesis, CalTech (2000).
Zhang, D. and Lu, G., Review of shape representations and description techniques, Pattern Recognition, 37(1):1-19.

\* cited by examiner

OBJECT DETECTION AND CLASSIFICATION WITH FOURIER FANS

BACKGROUND

Image feature descriptors are useful for identifying and classifying objects in captured images for use in a hazard detection and information system. It may be desirable for image feature descriptors to have certain qualities such as discriminative power, scale and rotation invariance, and mathematical interpretability.

SUMMARY

An object detection and classification system analyzes images captured by an image sensor for a hazard detection and information system, such as on a vehicle. Extracting circuitry is configured to extract at least one feature value from one or more keypoints in an image captured by an image sensor of the environment surrounding a vehicle. A new image feature descriptor is derived from a periodic descriptor function, which depends on the distance between at least one of the keypoints and a chosen query point in complex space and depends on a feature value of at least one of the keypoints in the image.

Query point evaluation circuitry is configured to sample the periodic descriptor function for a chosen query point in the image from the environment surrounding the vehicle to produce a sample value. The sample value for a query point may be evaluated to determine whether the query point is the center of an object or evaluated to determine what type of object the query point is a part of.

If the evaluated query point satisfies a potential hazard condition, such as if the object is classified as a vulnerable road user or object posing a collision threat, a signal bus is configured to transmit a signal to alert the operator of the vehicle to the object. Additionally, or alternatively, the signal bus may transmit a signal to a control apparatus of the vehicle to alter the vehicle's speed and/or direction to avoid collision with the object.

The object detection and classification system disclosed herein may be used in the area of transportation for identifying and classifying objects encountered in the environment surrounding a vehicle, such as on the road, rail, water, air, etc., and alerting the operator of the vehicle or autonomously taking control of the vehicle if the system determines the encountered object poses a hazard, such as a risk of collision or danger to the vehicle or to other vehicles or persons in the area.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

Other implementations are also described and recited herein.

BRIEF DESCRIPTIONS OF THE DRAWINGS

Figure 5:
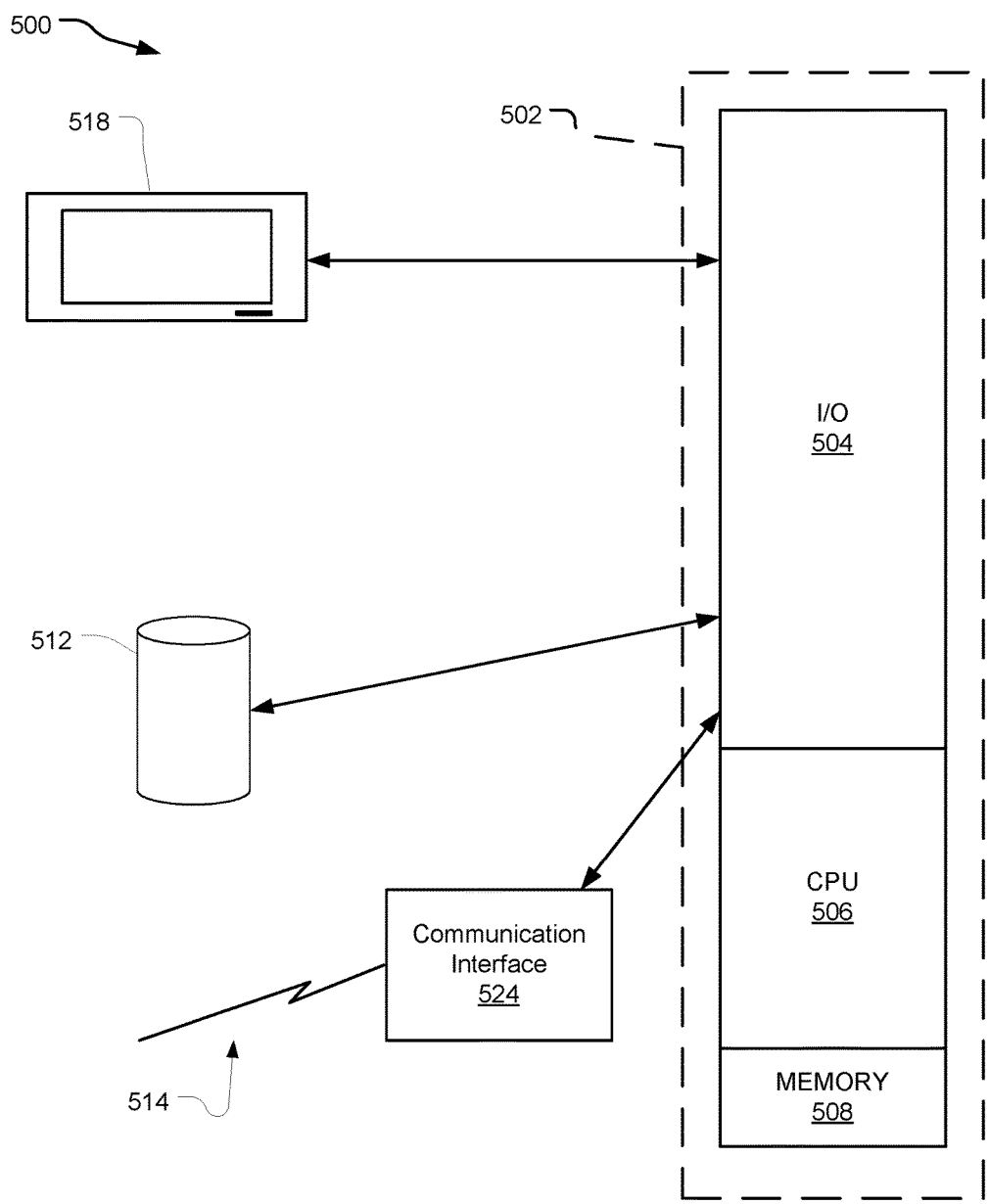

FIG. 5 discloses a block diagram of an example processor system suitable for implementing one or more aspects of an object detection and classification system with Fourier fans.

DETAILED DESCRIPTIONS

The implementations disclosed herein relate to an object detection and classification system for use in a variety of contexts. The present disclosure contains a novel feature descriptor that combines information relating to what a feature is with information relating to where the feature is located with respect to a query point. This feature descriptor provides advantages over prior feature descriptors because, by combining the "what" with the "where," it reduces the resources needed to detect and classify an object because a single descriptor can be used instead of multiple feature descriptors. The resulting system therefore is more efficient than prior systems, and can more accurately detect and classify objects in situations where hardware and/or software resources are limited.

Figure 1:
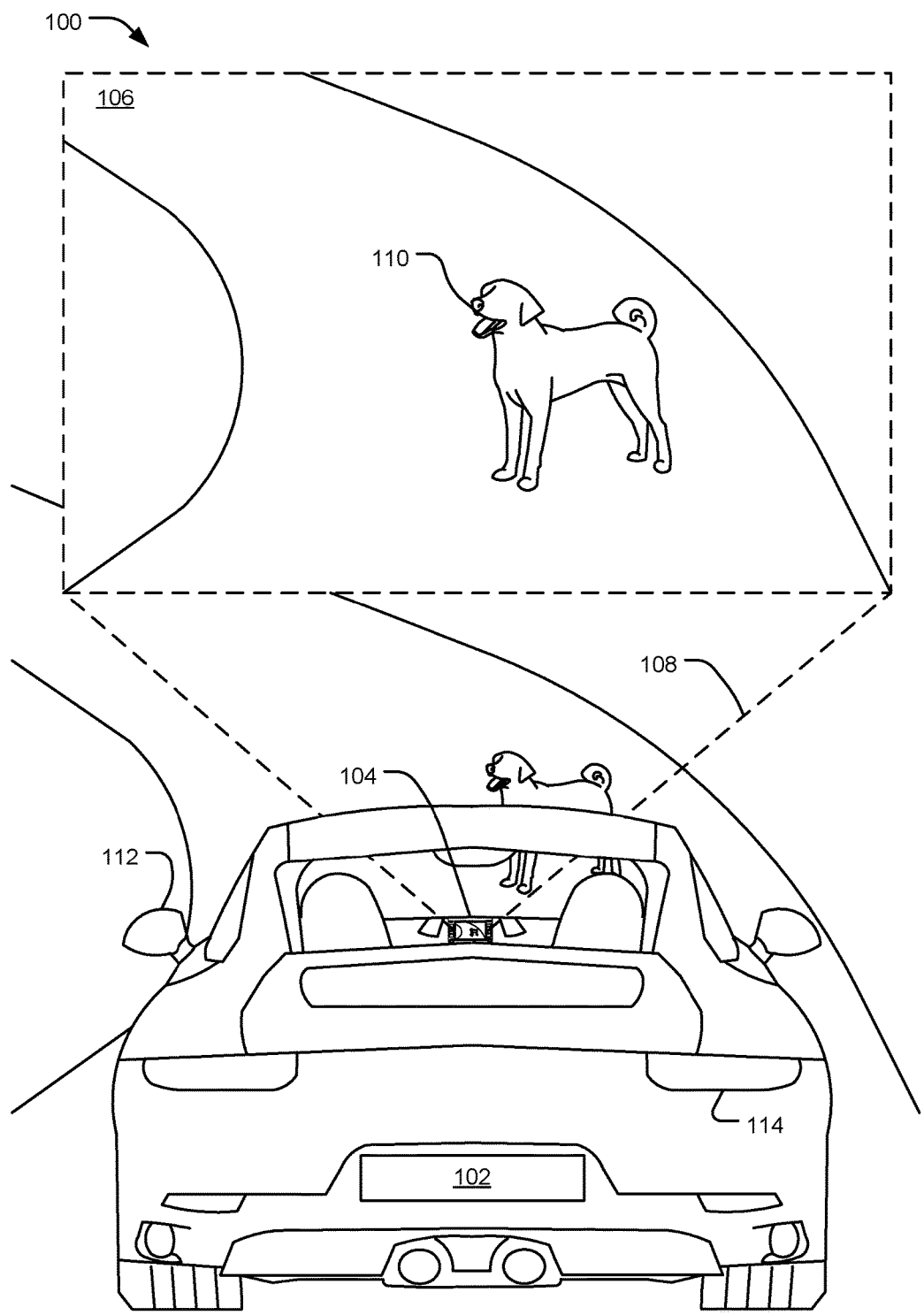
FIG. 1 illustrates a rear view of a vehicle with an object detection and classification system.

FIG. 1 illustrates a rear view of a vehicle 102 with an object detection and classification system 100 according to the present disclosure. The vehicle 102 includes an image sensor 104 to capture an image 106 of the environment surrounding the vehicle 102. The image may include a range of view through an angle 108, thus the image 106 may depict only a portion of the area surrounding the vehicle 102 as defined by the angle 108. The image 106 may include an object 110. The object 110 may be any physical object in the environment surrounding the vehicle 102, such as a pedestrian, another vehicle, a bicycle, a building, road signage, road debris, etc. The object detection and classification system 100 may assign a classification to the object 110. The classification may include the type of road object, whether the object is animate or inanimate, whether the object is likely to suddenly change direction, etc. The object detection and classification system 100 may further assign a range of characteristics to the object 110 such as a size, distance, a point representing the center of the object, a velocity of the object, an expected acceleration range, etc.

The image sensor 104 may be various types of optical image sensors, including without limitation a digital camera, a range finding camera, a charge-coupled device (CCD), a complementary metal oxide semiconductor (CMOS) sensor, or any other type of image sensor capable of capturing continuous real-time images. In an implementation, the vehicle 102 has multiple image sensors 104, each image sensor 104 may be positioned so as to provide a view of only a portion of the environment surrounding the vehicle 102. As a group, the multiple image sensors 104 may cover various views from the vehicle 102, including a front view of objects in the path of the vehicle 102, a rear-facing image sensor 104 for capturing images 106 of the environment surrounding the vehicle 102 including objects behind the vehicle 102, and/or side-facing image sensors 104 for capturing images 106 of object next to or approaching the vehicle 102 from the side. In an implementation, image sensors 102 may be located on various parts of the vehicle. For example, without limitation, image sensors 102 may be integrated into an exterior mirror of the vehicle 102, such as on the driver's exterior side mirror 112. Alternatively, or additionally, the image sensor 102 may be located on the back of the vehicle 102, such as in a rear-light unit 114. The image sensor 102 may be forward-facing and located in the interior rear-view mirror, dashboard, or in the front headlight unit of the vehicle 102.

Upon capture of an image 106 of the environment surrounding the vehicle 102, the object detection and classification system 100 may store the image 106 in a memory and perform analysis on the image 106. One type of analysis performed by the object detection and classification system 100 on the image 106 is the identification of keypoints and associated keypoint data. Keypoints, also known as interest points, are spatial locations or points in the image 106 that define locations that are likely of interest. Keypoint detections methods may be supplied by a third party library, such as the SURF and FAST methods available in the OpenCV (Open Source Computer Vision) library. Other methods of keypoint detection include without limitation SIFT (Scale-Invariant Feature Transform). Keypoint data may include a vector to the center of the keypoint describing the size and orientation of the keypoint, and visual appearance, shape, and/or texture in a neighborhood of the keypoint, and/or other data relating to the keypoint.

A function may be applied to a keypoint to generate a keypoint value. A function may take a keypoint as a parameter and calculate some characteristic of the keypoint. As one example, a function may measure the image intensity of a particular keypoint. Such a function may be represented as $f(z_k)$, where $f$ is the image intensity function and $z_k$ is the $k^{th}$ keypoint in an image. Other functions may also be applied, such a visual word in a visual word index.

Figure 2:
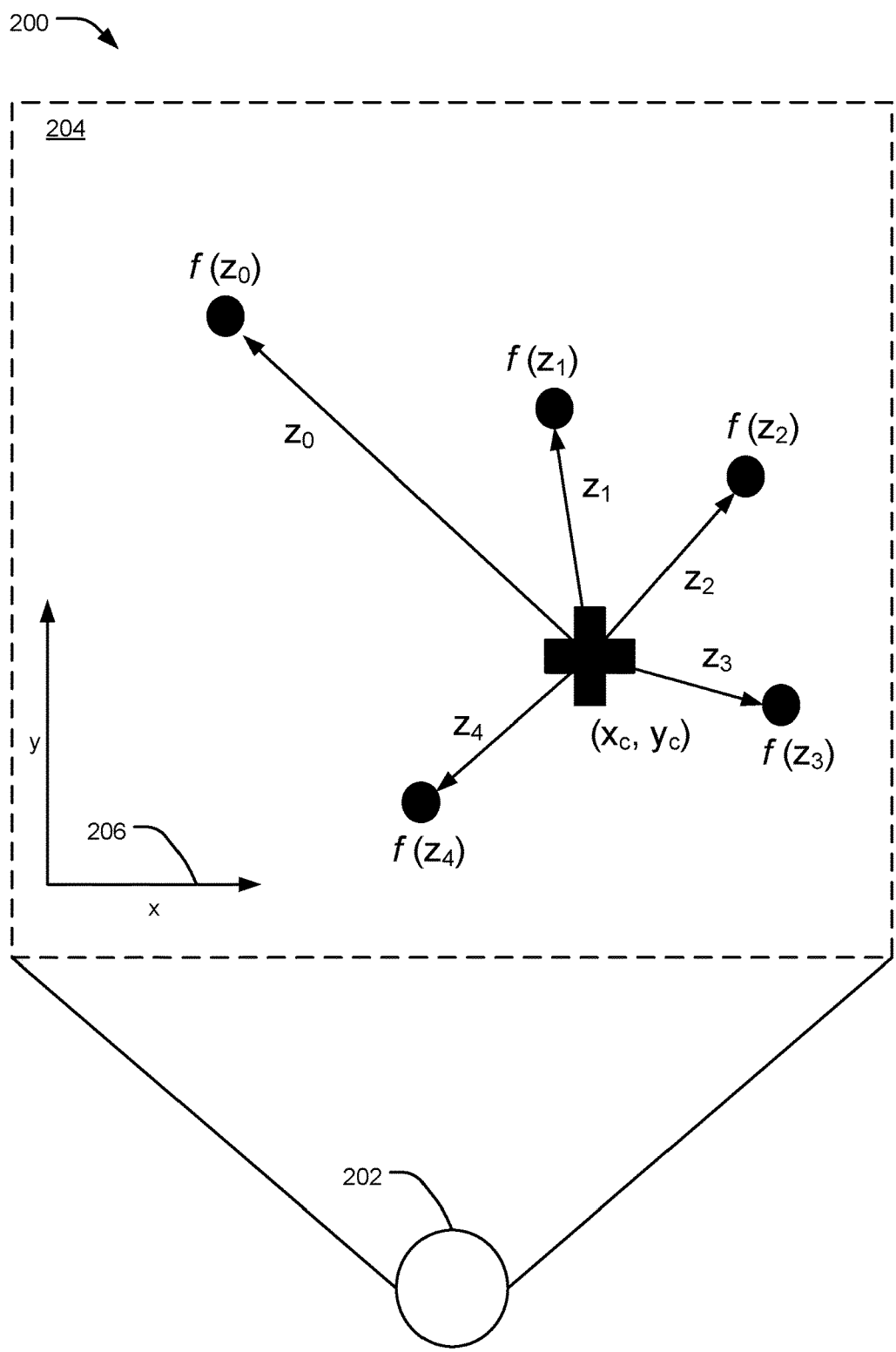
FIG. 2 illustrates a schematic of an image capture with a query point and a plurality of keypoints.

FIG. 2 illustrates a schematic diagram 200 of an image capture 204 taken by an image sensor 202 on a vehicle. The image capture 204 includes a query point ($x_c$, $y_c$) and a plurality of keypoints $z_0$-$z_4$. A query point is a point of interest that may or may not be a keypoint, for which the object detection and classification system may choose for further analysis. In an implementation, the object detection and classification system may attempt to determine whether a query point is the center of an object to assist in classification of the object.

Points in the image capture 204 may be described with reference to a Cartesian coordinate system wherein each point is represented by an ordered pair, the first digit of the pair referring to the point's position along the horizontal or x-axis, and the second digit of the pair referring to the point's position along the vertical or y-axis. The orientation of the horizontal and vertical axes with respect to the image 204 is shown by the axis 206. Alternatively, points in the image capture 204 may be referred to with complex numbers where each point is described in the form x+iy where i=√(−1). In another implementation, a query point may serve as the origin of a coordinate system, and the locations of keypoints relative to the query point may be described as vectors from the query point to each of the keypoints.

The image detection and classification system 100 uses a new descriptor function, to produce an evaluation of a query point in an image 204 that combines a representation of what the feature is and where the feature is located in relation to the query point into a single representation. For any image 204 with a set of keypoints $z_0$-$z_4$ in the neighborhood of a query point ($x_c$, $y_c$), the descriptor for the query point is as follows:

$$F(\zeta) = \frac{1}{N}\sum_{k=0}^{N-1}(z_k - z_c)e^{i2\pi f(z_k)\zeta} \quad (1)$$

where N is the number of keypoints in the image from the environment surrounding the vehicle in the neighborhood of the query point, $z_c$ is the query point represented in complex space, $z_k$ is the $k^{th}$ keypoint, $f(z_k)$ is the feature value of the $k^{th}$ keypoint, and $\zeta$ is the continuous independent variable of the descriptor function $F(\zeta)$.

To obtain a descriptor that is invariant to scale and orientation, Equation (1) may be modified by letting $z_m$ be the mean value of $z_k$ values:

$$z_m = \frac{1}{N}\sum_{k=0}^{N-1}(z_k - z_c) \quad (2)$$

By dividing the right-hand side of Equation (1) by $|z_m|$, a scale invariant version of the descriptor is obtained. On the other hand, by dividing both sides of Equation (1) by $$\frac{z_m}{|z_m|}$$

a rotation-invariatn version of the descriptor is obtained. In order to write a descriptor that is invariant in both scale and orientation, dividing by $z_m$ yields the following descriptor:

$$F(\zeta) = \frac{1}{z_m}\sum_{k=0}^{N-1}(z_k - z_c)e^{i2\pi f(z_k)\zeta} \quad (3)$$

The division by N is omitted from Equation (3) since the contribution of the keypoint number is already neutralized through the division by $z_m$. Due to the similarity of Equation (3) to the formula for the Inverse Fourier Series, Equation (3) may be referred to herein as a Fourier Fan.

Since Equation (3) is a function of a continuous variable $\zeta$, it may be sampled for use in the object detection and classification system 100. In an implementation, a sampling frequency greater than 2 max($f$) may be chosen where max( ) indicates the maximum value of the function $f$ Another characteristic of Equation (3) is that it is infinite over the domain of the variable $\zeta$. Sampling an infinite equation will result in an infinite number of samples, which may not be practical for use in the object detection and classification system 100. If Equation (3) is a periodic function, however, then it would be sufficient to sample one only a single period of Equation (3), and to ignore the remaining periods. In an implementation, Equation (3) is made to be periodic by requiring all values of the function $f$ to be integer multiples of a single frequency $f_0$. As such, for Equation (3) to be able to be sampled, the function $f$ must have a known maximum, and for the Equation (3) to be periodic, the function $f$ must be quantized such that the values of $f$ are integer multiples of $f_0$.

In an implementation, the function $f$ may represent more than a simple feature, such as the image intensity. Instead, the function $f$ may be a descriptor function of each of the keypoints, such as those referred to herein (e.g., SIFT and/or SURF descriptors). Such descriptors are usually not simple scalar values, but rather are more likely to be high dimensional feature vectors, which cannot be incorporated directly in Equation (3) in a trivial manner. It is, however, possible to incorporate complex descriptors as feature values by clustering the descriptors in an entire set of training data and to use the index of the corresponding cluster as the value for $f$. Such cluster centers may be referred to as "visual words" for $f$. Let $f_k$ be the descriptor for a keypoint k, $f_k$ takes integer values, e.g., 3, then there is a descriptor at the keypoint located at $z_k$-$z_c$, which can be assigned to cluster 3.

It should be appreciated that, in this example, $f$ is quantized and the number of clusters is the function's maximum which is known. These characteristics are relevant because they are the characteristics of $f$ needed to make Equation (3) able to be sampled and periodic.

In an implementation, an order is imposed on the visual word cluster centers, such that the output of $f$ is not a categorical value. In other words, without an order, the distance between cluster 2 and cluster 3 is not necessarily less than the distance between cluster 2 and cluster 10 because the numerical values are merely identifiers for the clusters. An order for the visual words may be imposed using multidimensional scaling (MDS) techniques. Using MDS, one can find a projection into a low dimensional feature space from a high dimensional feature space such that distances in the low dimensional feature space resemble as much as possible distances in the high dimensional feature space. Applied to the visual words using MDS, the cluster centers may be projected into a one dimensional space for use as a parameter for $f$. In one implementation, a one dimensional feature space is chosen as the low dimensional feature space because one dimensional space is the only space in which full ordering is possible.

The object detection and classification system may be tuned according to a set of training data during which parameters for the system may be chosen and refined. For example, descriptor values and types may be chosen, the size of the neighborhood around a query point may be set, the method of choosing keypoints, the number of keypoints chosen per image, etc. may also be chosen. Since the tuning of the object detection and classification system is a type of machine learning, it may be susceptible to a problem known as "overfitting." Overfitting manifests itself when machine classifiers over-learn the training data leading to models which do not generalize well on other data, the other data being referred to herein as "test data." In the descriptor of Equation (3), overfitting could occur if, on training data, the object detection and classification system overfits the positions of the keypoints with respect to the query point. Changes in the positions of the keypoints that are not present in training data, which could occur due to noise and intra-class variance, will not always be handled well by the object detection and classification system when acting on test data. To address the issue of overfitting, at each query point $(x_c, y_c)$, instead of extracting a single Fourier Fan Equation (3) on training data, multiple random Fans may be extracted, denoted by the set $M_f$ (e.g., $15_f$). Each of the random Fans contains only a subset of the available N keypoints in the neighborhood of the query point $(x_c, y_c)$. Later, when the object detection and classification system is running on test data, the same set $M_f$ of random Fourier Fans is extracted, and the result is confirmed according to majority agreement among the set of random Fourier Fans. Random Fourier Fans also allow the object detection and classification system to learn from a small number of images since several feature vectors are extracted at each object center.

In the comparison of Equation (3), the "Fourier Fan," to the formula for the inverse Fourier Series, it should be understood that there are some differences between the two. For example, only those frequencies that belong to the neighborhood of a query point are available for each Fourier Fan. As another example, shifting all coefficients $z_k$ by a constant $z_a$, i.e. a shift of the object center, is not equivalent to adding a Dirac impulse in the $\zeta$ domain, even if it is assumed that the same keypoints are available in the new query point neighborhood. This is true because the addition of $z_a$ is not a constant everywhere, but only to the available frequencies, and zero for the other frequencies.

Figure 3:
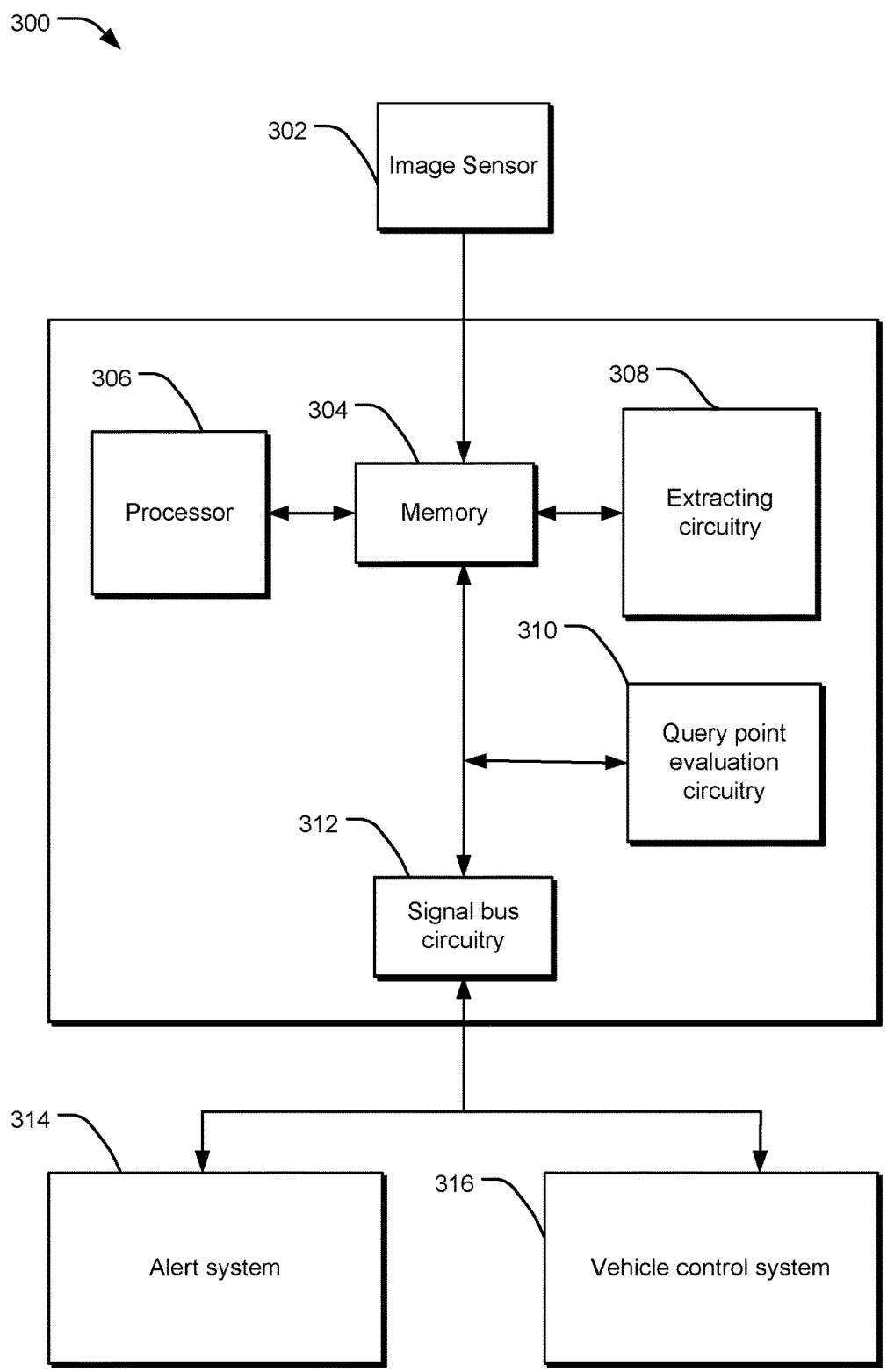
FIG. 3 illustrates a block diagram of a system that may be useful in implementing the implementations disclosed herein.

FIG. 3 illustrates a block diagram of an object detection and classification system 300 that may be useful for the implementations disclosed herein. The object detection and classification system 300 includes an image sensor 302 directed at the environment surrounding a vehicle. The image sensor 302 may capture images of the environment surrounding the vehicle for further analysis by the object detection and classification system 300. Upon capture, an image from the environment surrounding a vehicle may be stored in the memory 304. The memory 304 may include volatile or non-volatile memory and may store images captured by the image sensor as well as data produced by analysis of the images captured by the image sensor. A processor 306 may carry out operations on the images stored in memory 304. The memory 304 may also store executable program code in the form of program modules that may be executed by the processor 306. Program modules stored on the memory 304 include without limitation, hazard detection program modules, image analysis program modules, lens obstruction program modules, blind spot detection program modules, shadow detection program modules, traffic sign detection program modules, park assistance program modules, collision control and warning program modules, etc.

The memory 304 may further store parameters and settings for the operation of the object detection and classification system 300. For example, parameters relating to the training data may be stored on the memory 304 including a library of functions $f$ and keypoint settings for computation and calculation of Random Fourier Fans. The memory 304 may further be communicatively coupled to extracting circuitry 308 for extracting keypoints from the images stored on the memory 304. The memory 304 may further be communicatively coupled to query point evaluation circuitry 310 for taking image captures with keypoints and associated keypoint data and evaluating the images with keypoints and keypoint data according to Fourier Fans to produce sampled Fourier Fan values.

If the sampled Fourier Fan values produced by the query point evaluation circuitry 310 meet a potential hazard condition, then signal bus circuitry 312 may send a signal to an alert system 314 and/or a vehicle control system 316. Sampled Fourier Fan values may first be processed by one or more program modules residing on memory 304 to determine whether the sampled values meet a potential hazard condition. Examples of sampled values that may meet a potential hazard condition are an object determined to be a collision risk to the vehicle, an object that is determined to be a vulnerable road user that is at risk of being struck by the vehicle, a road sign object that indicates the vehicle is traveling in the wrong part of a road or on the wrong road, objects that indicate a stationary object that the vehicle might strike, objects that represent a vehicle located in a blind spot of the operator of the vehicle.

If the sampled values of a Fourier Fan function satisfy a potential hazard condition, the signal bus circuitry 312 may send one or more signals to the alert system 314. In an implementation, signals sent to the alert system 312 include acoustic warnings to the operator of the vehicle. Examples of acoustic warnings include bells or beep sounds, computerized or recorded human language voice instructions to the operator of the vehicle to suggest a remedial course of action to avoid the cause the of sample value meeting the potential hazard condition. In another implementation, signals sent to the alert system 314 include tactile or haptic feedback to the operator of the vehicle. Examples of tactile or haptic feedback to the operator of the vehicle include without limitation shaking or vibrating the steering wheel or control structure of the vehicle, tactile feedback to the pedals, such as a pedal that, if pushed, may avoid the condition that causes the sample value of the Fourier Fan to meet the potential hazard condition, vibrations or haptic feedback to the seat of the driver, etc. In another implementation, signals sent to the alert system 314 include visual alerts displayed to the operator of the vehicle. Examples of visual alerts displayed to the operator of the vehicle include lights or indications appearing on the dashboard, heads-up display, and/or mirrors visible to the operator of the vehicle. In one implementation, the visual alerts to the operator of the vehicle include indications of remedial action that, if taken by the operator of the vehicle, may avoid the cause of the sample value of the Fourier Fan meeting the potential hazard condition. Examples of remedial action, include an indication of another vehicle in the vehicle's blind spot, an indication that another vehicle is about to overtake the vehicle, an indication that the vehicle will strike an object in reverse that may not be visible to the operator of the vehicle, etc.

In another implementation, if the sampled values of a Fourier Fan function satisfy a potential hazard condition, the signal bus circuitry 312 may send one or more signals to the vehicle control system 316. Examples of signals sent to the vehicle control system 316 include signals to the steering system to alter the direction of the vehicle in an attempt to avoid the object that is the cause of the sampled values of the Fourier Fan function to satisfy the potential hazard condition. In another implementation, a signal sent to the vehicle control system 316 may include signals to sound the horn of the vehicle to alert the object that caused the sample values of the Fourier Fan function to satisfy the hazard condition that the vehicle with the object detection and classification system is present. In yet another implementation, the signal sent to the vehicle control system 316 include a signal to engage the brakes of the vehicle to avoid a collision with the detected object.

Figure 4:
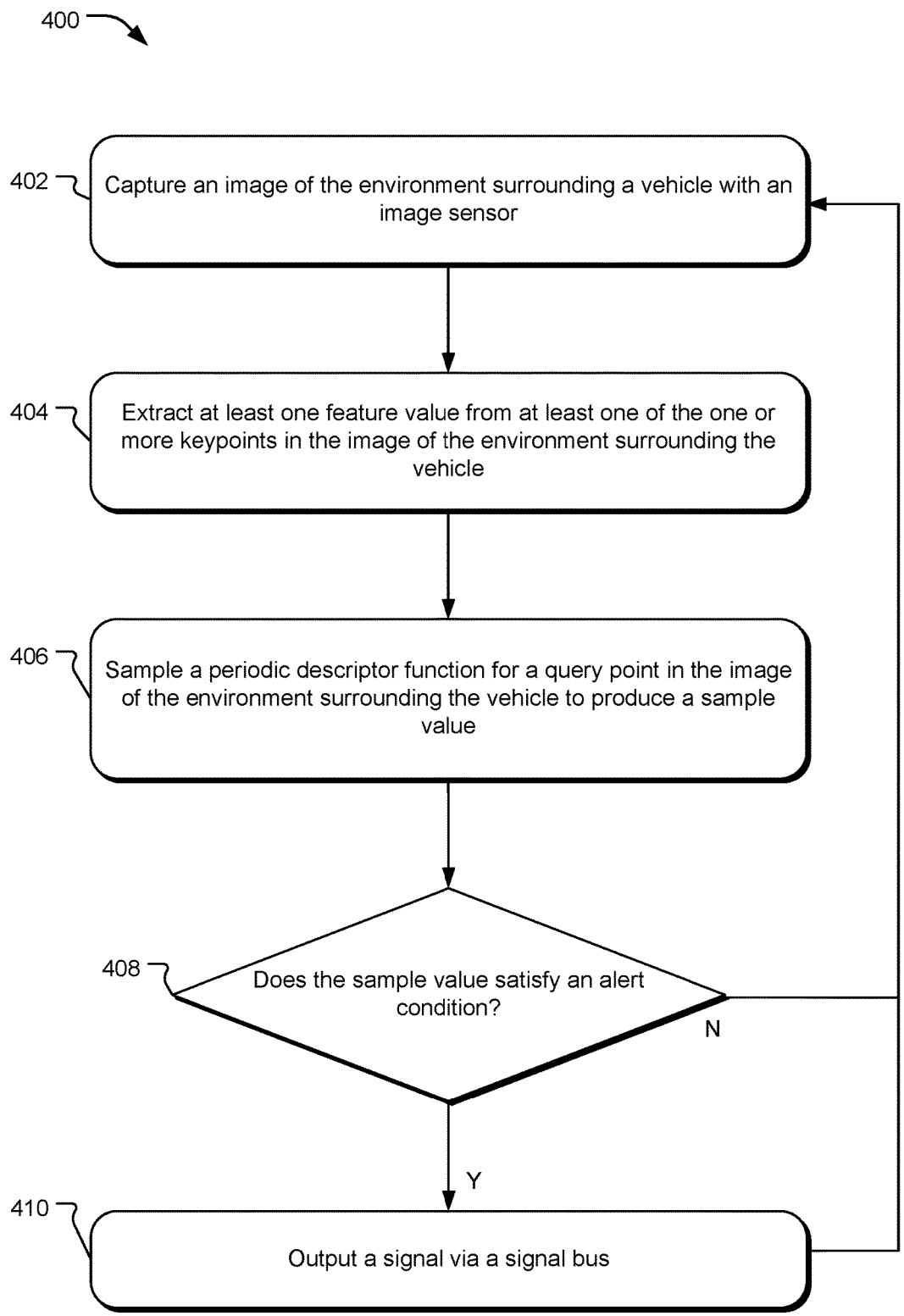
FIG. 4 illustrates example operations for detecting and classifying an object and transmitting a signal to an alert system and/or to a vehicle control system.

FIG. 4 illustrates example operations 400 for detecting and classifying an object and outputting a signal if a sample value of a Fourier Fan meets a potential hazard condition. A capturing operation 402 captures an image from the environment surrounding a system with an image sensor, the image from the environment surrounding the system having one or more keypoints. The image from the environment surrounding the system may be captured by an image sensor mounted anywhere on the system. In one implementation, the system is a vehicle. The captured image may be stored in a memory in an object detection and classification system. Once stored, a processor may execute a keypoint detection program module to identify the keypoints. Alternatively, or additionally, extracting circuitry may identify the keypoints in the image. The keypoints may be identified according to a number of methods, such as methods provided by third party libraries, and data parameters for the methods, such as the number of keypoints to extract or conditions for a keypoint extraction may be stored on the memory in the object detection and classification system.

Extracting operation 404 extracts at least one feature value from at least one of the one or more keypoints in the image from the environment surrounding the system. A processor may execute a feature value extraction program module to extract the features values of keypoints. Alternatively, or additionally, extracting circuitry may extract the feature values of keypoints in the stored image. The feature value of a keypoint may be determined according to a function $f$. In some embodiments, the function f may have certain characteristics for use in a Fourier Fan Equation: having a known maximum, such that a sampling rate may be set to 2 max($f$), and being periodic, such that only one period of $f$ need be sampled.

Sampling operation 406 samples a periodic descriptor function for a query point in the image from the environment surrounding the system to produce a sample value, the periodic descriptor function depending on the distance between at least one of the one or more keypoints and the query point in complex space, the periodic descriptor function further depending on at least one feature value extracted from at least one of the one or more keypoints in the image from the environment surrounding the vehicle. In an implementation, the sampled periodic descriptor function in sampling operation 406 is Equation (3).

At decision block 408, if the sample value of the periodic descriptor function does not meet a potential hazard condition, then the method ends or returns to capturing operation 402. If the sample value of the periodic descriptor function does meet a potential hazard condition, then outputting operation 410 sends a signal via a signal bus. The signal sent via the signal bus in outputting operation 410 may be to an alert system of a vehicle, which may display an acoustic or visual signal to the operator of the vehicle regarding the object that is the cause of the sample value exceeding the potential hazard condition. In another embodiment, the signal bus sends at outputting operation 410 a signal to a vehicle control system. The system sent to the vehicle control system may cause the vehicle to change speed or direction without intervention from the operator of the vehicle to avoid a collision with the object that caused the sample value to exceed the potential hazard condition.

FIG. 5 discloses a block diagram of a processor system 500 suitable for implementing one or more aspects of an object detection and classification system with fourier fans. The processor system 500 is capable of executing a processor program product embodied in a tangible processor-readable storage medium. Data and program files may be input to the processor system 500, which reads the files and executes the programs therein using one or more processors. Some of the elements of a processor system 500 are shown in FIG. 5 wherein a processor 502 is shown having an input/output (I/O) section 504, a Central Processing Unit (CPU) 506, and a memory section 508. There may be one or more processors 502, such that the processor 502 of the computing system 500 comprises a single central-processing unit 506, or a plurality of processing units. The processors may be single core or multi-core processors. The described technology is optionally implemented in software loaded in memory 508, a disc storage unit 512, and/or communicated via a wired or wireless network link 514 on a carrier signal (e.g., Ethernet, 3G wireless, 5G wireless, LTE (Long Term Evolution)) thereby transforming the processing system 500 in FIG. 5 to a special purpose machine for implementing the described operations. The disc storage unit 512 may include volatile memory, non-volatile memory, solid state memory, flash memory, hybrid, and/or traditional magnetic rotating data storage media.

The I/O section 504 may be connected to one or more user-interface devices (e.g., a mobile device, a touch-screen display unit 518, etc.) or the disc storage unit 512. Processor program products containing mechanisms to effectuate the systems and methods in accordance with the described technology may reside in the memory section 508 or on the storage unit 512 of such a system 500.

A communication interface 524 is capable of connecting the processor system 500 to an enterprise network via the network link 514, through which the processor system 500 can receive and/or send instructions and data embodied in a carrier wave. The communication interface 524 may receive signals and data representing an image from the environment surrounding the system via an image sensor. The communication interface may send signals from the processor system 500 to the image detection and classification system including without limitation audible alert signals sent to the operator of a vehicle, data signals sent to a HUD (heads-up-display) visible to the operator of a vehicle, a video screen such as display 518 that is visible to the operator of a vehicle for display of information regarding objects and/or alerts, a vehicle control signal for altering the control of a vehicle to avoid a hazard, etc.

When used in a local area networking (LAN) environment, the processor system 500 is connected (by wired connection or wirelessly) to a local network through the communication interface 524, which is one type of communications device. When used in a wide-area-networking (WAN) environment, the processor system 500 typically includes a modem, a network adapter, or any other type of communications device for establishing communications over the wide area network. In a networked environment, program modules depicted relative to the processor system 500 or portions thereof, may be stored in a remote memory storage device. It is appreciated that the network connections shown are examples of communications devices for, and other means of, establishing a communications link between the processor and other devices may be used.

In an example implementation, a network agent of an enterprise network may be embodied by instructions stored in memory 508 and/or the storage unit 512 and executed by the processor 502. Further, local computing systems, remote data sources and/or services, and other associated logic represent firmware, hardware, and/or software, which may be configured to transmit data outside of the enterprise network via the network agent. The network agent of the enterprise network may be implemented using a general purpose computer and specialized software (such as a server executing service software), a special purpose computing system and specialized software (such as a mobile device or network appliance executing service software), or other computing configurations. In addition, data-selection policies and data transmission preparation policies may be stored in the memory 508 and/or the storage unit 512 and executed by the processor 502.

An example system includes an image sensor mounted on a system and configured to capture an image from the environment surrounding the system, the image from the environment surrounding the system including one or more keypoints, extracting circuitry configured to extract at least one feature value from at least one of the one or more keypoints in the image from the environment surrounding the system, query point evaluation circuitry communicatively coupled to the image sensor and the extracting circuitry and configured to classify an object by sampling a periodic descriptor function for a query point in the image from the environment surrounding the system to produce a sample value, the periodic descriptor function depending on the distance between at least one of the one or more keypoints and the query point in complex space, the periodic descriptor function further depending on at least one feature value extracted from at least one of the one or more keypoints in the image from the environment surrounding the system, and a signal bus configured to transmit a signal to the operator of the system if the sample value satisfies an alert condition.

An example system of any preceding system includes that the periodic descriptor function is defined as follows:

$$F(\zeta) = \frac{1}{N}\sum_{k=0}^{N-1}(z_k - z_c)e^{i2\pi f(z_k)\zeta}$$

where N is the number of keypoints in the image from the environment surrounding the system in the neighborhood of the query point, $z_c$ is the query point represented in complex space, $z_k$ is the $k^{th}$ keypoint, $\theta$ ($z_k$) is the feature value of the $k^{th}$ keypoint, and $\zeta$ is the continuous independent variable of the descriptor function $F(\zeta)$.

An example system of any preceding system includes that the periodic descriptor function is a scale-invariant or rotation-invariant function defined as follows:

$$F(\zeta) = \frac{1}{z_m}\sum_{k=0}^{N-1}(z_k - z_c)e^{i2\pi f(z_k)\zeta}$$

wherein:

$$z_m = \frac{1}{N}\sum_{k=0}^{N-1}(z_k - z_c).$$

An example system of any preceding system includes the signal transmitted to the operator of the system is an audible alert.

An example system of any preceding system includes the signal transmitted to the operator of the system is a visual alert.

An example system of any preceding system includes the signal transmitted to the operator of the system includes haptic feedback.

An example system of any preceding system includes the at least one feature value includes a visual appearance feature.

An example system of any preceding system includes the at least one feature value includes a visual word index in a dictionary of visual words, the visual word index having an order relation determined by multi-dimensional scaling.

An example system of any preceding system includes the feature values of the $k^{th}$ keypoint are integer multiples of a single frequency $f_0$.

An example system of any preceding system includes the query point evaluation circuitry is further configured to sample a plurality of randomized descriptor functions, each randomized descriptor function including only a subset of the one or more keypoints.

An example system of any preceding system includes that the system is a vehicle.

An example system of any preceding system includes that the signal to the system is a vehicle control signal.

An example system includes means for capturing an image from the environment surrounding a system with an image sensor, the image from the environment surrounding the system having one or more keypoints. The example system further includes means for extracting at least one feature value from at least one of the one or more keypoints in the image from the environment surrounding the system. The example system further includes means for sampling a periodic descriptor function for a query point in the image from the environment surrounding the system to produce a sample value to classify an object, the periodic descriptor function depending on the distance between at least one of the one or more keypoints and the query point in complex space, the periodic descriptor function further depending on at least one feature value extracted from at least one of the one or more keypoints in the image from the environment surrounding the system. The example system further includes means for outputting an alert signal via a signal bus if the sample value satisfies an alert condition.

An example method includes capturing an image from the environment surrounding a system with an image sensor, the image from the environment surrounding the system having one or more keypoints, extracting at least one feature value from at least one of the one or more keypoints in the image from the environment surrounding the system, sampling a periodic descriptor function for a query point in the image from the environment surrounding the system to produce a sample value to classify an object, the periodic descriptor function depending on the distance between at least one of the one or more keypoints and the query point in complex space, the periodic descriptor function further depending on at least one feature value extracted from at least one of the one or more keypoints in the image from the environment surrounding the system, and outputting an alert signal via a signal bus if the sample value satisfies an alert condition.

An example method of any preceding method includes that the periodic descriptor function is defined as follows:

$$F(\zeta) = \frac{1}{N}\sum_{k=0}^{N-1}(z_k - z_c)e^{i2\pi f(z_k)\zeta}$$

where N is the number of keypoints in the image from the environment surrounding the system in the neighborhood of the query point, $z_c$ is the query point represented in complex space, $z_k$ is the $k^{th}$ keypoint, $f(z_k)$ is the feature value of the $k^{th}$ keypoint, and $f$ is the continuous independent variable of the descriptor function $F(\zeta)$.

An example method of any preceding method includes that the alert signal results in an audible alert.

An example method of any preceding method includes that the alert signal results in a visual alert.

An example method of any preceding method includes that the alert signal results in haptic feedback to the operator of the system.

An example method of any preceding method includes that the at least one feature includes an image intensity.

An example method of any preceding method includes that the at least one feature value includes a visual word index in a dictionary of visual words.

An example method of any preceding method includes that the visual word index has an order relation determined by multi-dimensional scaling.

An example method of any preceding method includes that the feature values of the $k^{th}$ keypoint are integer multiples of a single frequency $f_0$.

An example method of any preceding method includes that the periodic descriptor function is a scale-invariant or rotation-invariant function defined as follows:

$$F(\zeta) = \frac{1}{z_m}\sum_{k=0}^{N-1}(z_k - z_c)e^{i2\pi f(z_k)\zeta}$$

wherein $$z_m = \frac{1}{z_m}\sum_{k=0}^{N-1}(z_k - z_c).$$

An example method of any preceding method includes that the sampling operation includes sampling a plurality of randomized descriptor functions, each randomized descriptor function including only a subset of the one or more keypoints.

An example system includes an image sensor mounted on a system and configured to capture an image from the environment surrounding the system, the image from the environment surrounding the system including one or more keypoints, one or more processors, and a memory storing processor-executable instructions to perform the operations of: extracting, by the processor, at least one feature value from at least one of the one or more keypoints in the image from the environment surrounding the system; sampling, by the processor, a periodic descriptor function for a query point in the image from the environment surrounding the system to produce a sample value to classify an object, the periodic descriptor function depending on the distance between at least one of the one or more keypoints and the query point in complex space, the periodic descriptor function further depending on at least one feature value extracted from at least one of the one or more keypoints in the image from the environment surrounding the system, and outputting, by the processor, an alert signal via a signal bus if the sample value satisfies an alert condition.

An example system of any preceding system includes that the periodic descriptor function is defined as follows:

$$F(\zeta) = \frac{1}{N}\sum_{k=0}^{N-1}(z_k - z_c)e^{i2\pi f(z_k)\zeta}$$

where N is the number of keypoints in the image from the environment surrounding the system in the neighborhood of the query point, $z_c$ is the query point represented in complex space, $z_k$ is the $k^{th}$ keypoint, $f(z_k)$ is the feature value of the $k^{th}$ keypoint, and $\zeta$ is the continuous independent variable of the descriptor function $F(\zeta)$.

An example system of any preceding system includes that the alert signal results in an audible alert.

An example system of any preceding system includes that the alert signal results in a visual alert.

An example system of any preceding system includes that the alert signal results in haptic feedback to the operator of the system.

An example system of any preceding system includes that the at least one feature includes an image intensity.

An example method of any preceding method includes that the at least one feature value includes a visual word index in a dictionary of visual words.

An example method of any preceding method includes that the visual word index has an order relation determined by multi-dimensional scaling.

An example system of any preceding system includes that the feature values of the $k^{th}$ keypoint are integer multiples of a single frequency $f_0$.

An example system of any preceding system includes that the periodic descriptor function is a scale-invariant or rotation-invariant function defined as follows:

$$F(\zeta) = \frac{1}{z_m}\sum_{k=0}^{N-1}(z_k - z_c)e^{i2\pi f(z_k)\zeta}$$

wherein:

$$z_m = \frac{1}{N}\sum_{k=0}^{N-1}(z_k - z_c).$$

An example system of any preceding system includes the sampling operation includes sampling a plurality of randomized descriptor functions, each randomized descriptor function including only a subset of the one or more keypoints.

The implementations described herein may be implemented as processor-implemented methods, with circuitry such as ASIC designs, or any combination thereof. The system described herein may include a variety of tangible computer-readable storage media and intangible computer-readable communication signals. Tangible computer-readable storage can be embodied by any available media that can be accessed by the object detection and classification system and includes both volatile and nonvolatile storage media, removable and non-removable storage media. Tangible computer-readable storage media excludes intangible communications signals and includes volatile and nonvolatile, removable and non-removable storage media implemented in any method or technology for storage of information such as computer readable instructions executable by a processor, data structures, program modules or other data. Tangible computer-readable storage media includes, but is not limited to, RAM, ROM, EEPROM, flash memory or other memory technology, CDROM, digital versatile disks (DVD) or other optical disk storage, magnetic cassettes, magnetic tape, magnetic disk storage or other magnetic storage devices, or any other tangible medium which can be used to store the desired information and which can be accessed by the object detection and classification system. In contrast to tangible computer-readable storage media, intangible computer-readable communication signals may embody computer readable instructions executable by a processor, data structures, program modules or other data resident in a modulated data signal, such as a carrier wave or other signal transport mechanism. The term "modulated data signal" means a signal that has one or more of its characteristics set or changed in such a manner as to encode information in the signal. By way of example, and not limitation, intangible communication signals include wired media such as a wired network or direct-wired connection, and wireless media such as acoustic, RF, infrared and other wireless media.

Some embodiments may comprise an article of manufacture. An article of manufacture may comprise a tangible storage medium to store logic. Examples of a storage medium may include one or more types of computer-readable storage media capable of storing electronic data, including volatile memory or non-volatile memory, removable or non-removable memory, erasable or non-erasable memory, writeable or re-writeable memory, and so forth. Examples of the logic may include various software elements, such as software components, programs, applications, computer programs, application programs, system programs, machine programs, operating system software, middleware, firmware, software modules, routines, subroutines, functions, methods, procedures, software interfaces, application program interfaces (API), instruction sets, computing code, computer code, code segments, computer code segments, words, values, symbols, or any combination thereof. In one embodiment, for example, an article of manufacture may store executable computer program instructions that, when executed by a computer, cause the computer to perform methods and/or operations in accordance with the described embodiments. The executable computer program instructions may include any suitable type of code, such as source code, compiled code, interpreted code, executable code, static code, dynamic code, and the like. The executable computer program instructions may be implemented according to a predefined computer language, manner or syntax, for instructing a computer to perform a certain function. The instructions may be implemented using any suitable high-level, low-level, object-oriented, visual, compiled and/or interpreted programming language.

The implementations described herein are implemented as logical steps in one or more computer systems. The logical operations may be implemented (1) as a sequence of processor-implemented steps executing in one or more computer systems and (2) as interconnected machine or circuit modules within one or more computer systems. The implementation is a matter of choice, dependent on the performance requirements of the computer system being utilized. Accordingly, the logical operations making up the implementations described herein are referred to variously as operations, steps, objects, or modules. Furthermore, it should be understood that logical operations may be performed in any order, unless explicitly claimed otherwise or a specific order is inherently necessitated by the claim language. The above specification, examples, and data, together with the attached appendices, provide a complete description of the structure and use of exemplary implementations.

Although the present examples may be described and illustrated herein as implemented on a smartphone or a mobile phone, the present examples are suitable for application in a variety of different computing devices including hand-held devices, phones, tablets, desktop computers, and other electronic devices.

What is claimed is:

1. A system comprising:
an image sensor configured to capture an image from an environment surrounding the system, the image from the environment surrounding the system including one or more keypoints;
extracting circuitry communicatively coupled to the image sensor and configured to extract at least one feature value from at least one of the one or more keypoints in the image from the environment surrounding the system;
query point evaluation circuitry communicatively coupled to the image sensor and the extracting circuitry and configured to classify an object by sampling a periodic descriptor function for a query point in the image from the environment surrounding the system to produce a sample value, the periodic descriptor function depending on the distance between at least one of the one or more keypoints and the query point in complex space, the periodic descriptor function further depending on at least one feature value extracted from at least one of the one or more keypoints in the image from the environment surrounding the system, wherein:
the periodic descriptor function is defined as:

$$F(\zeta) = \frac{1}{N}\sum_{k=0}^{N-1}(z_k - z_c)e^{i2\pi f(z_k)\zeta}$$

where N is the number of keypoints in the image from the environment surrounding the system in the neighborhood of the query point, $z_c$ is the query point represented in complex space, $z_k$ is the $k^{th}$ keypoint, $f(z_k)$ is the feature value of the $k^{th}$ keypoint, and $\zeta$ is the continuous independent variable of the descriptor function $F(\zeta)$, or the periodic descriptor function is a scale-invariant or rotation invariant function defined as:

$$F(\zeta) = \frac{1}{z_m}\sum_{k=0}^{N-1}(z_k - z_c)e^{i2\pi f(z_k)\zeta}$$

wherein $$z_m = \frac{1}{N}\sum_{k=0}^{N-1}(z_k - z_c);$$

and
a signal bus configured to transmit a signal to the operator of the system if the sample value satisfies an alert condition.

2. The system of claim 1, wherein the at least one feature value includes a visual word index in a dictionary of visual words.

3. The system of claim 1, wherein the visual word index has an order relation determined by multi-dimensional scaling.

4. The system of claim 1, wherein the feature values of the $k^{th}$ keypoint are integer multiples of a single frequency $f_0$.

5. The system of claim 1, wherein the system includes a vehicle.

6. The system of claim 1, wherein the signal to the system includes a vehicle control signal.

7. A method comprising:
capturing an image from an environment surrounding a system with an image sensor, the image from the environment surrounding the system having one or more keypoints;
extracting at least one feature value from at least one of the one or more keypoints in the image from the environment surrounding the system;
sampling a periodic descriptor function for a query point in the image from the environment surrounding the system to produce a sample value for classifying an object, the periodic descriptor function depending on the distance between at least one of the one or more keypoints and the query point in complex space, the periodic descriptor function further depending on at least one feature value extracted from at least one of the one or more keypoints in the image from the environment surrounding the system, wherein:
the periodic descriptor function is defined as:

$$F(\zeta) = \frac{1}{N}\sum_{k=0}^{N-1}(z_k - z_c)e^{i2\pi f(z_k)\zeta}$$

where N is the number of keypoints in the image from the environment surrounding the system in the neighborhood of the query point, $z_c$ is the query point represented in complex space, $z_k$ is the $k^{th}$ keypoint, $f(z_k)$ is the feature value of the $k^{th}$ keypoint, and $\zeta$ is the continuous independent variable of the descriptor function $F(\zeta)$, or
the periodic descriptor function is a scale-invariant and rotation-invariant function defined as:

$$F(\zeta) = \frac{1}{z_m}\sum_{k=0}^{N-1}(z_k - z_c)e^{i2\pi f(z_k)\zeta}$$

wherein $$z_m = \frac{1}{N}\sum_{k=0}^{N-1}(z_k - z_c);$$

and outputting an alert signal via a signal bus if the sample value satisfies an alert condition.

8. The method of claim 7, wherein the at least one feature value includes a visual word in a visual word index, the visual word index having an order relation determined by multi-dimensional scaling.

9. The method of claim 7, wherein the feature values of the $k^{th}$ keypoint are integer multiples of a single frequency $f_0$.

10. The method of claim 7, wherein the sampling operation includes sampling a plurality of randomized descriptor functions, each randomized descriptor function including only a subset of the one or more keypoints.

11. A system comprising:
an image sensor configured to capture an image from an environment surrounding the system, the image from the environment surrounding the system including one or more keypoints;
one or more processors; and
a memory storing computer-executable instructions to perform the operations of:
extracting, by the processor, at least one feature value from at least one of the one or more keypoints in the image from the environment surrounding the system;
sampling, by the processor, a periodic descriptor function for a query point in the image from the environment surrounding the system to produce a sample value to classify an object, the periodic descriptor function depending on the distance between at least one of the one or more keypoints and the query point in complex space, the periodic descriptor function further depending on at least one feature value extracted from at least one of the one or more keypoints in the image from the environment surrounding the system, wherein:
the periodic descriptor function is defined as:

$$F(\zeta) = \frac{1}{N}\sum_{k=0}^{N-1}(z_k - z_c)e^{i2\pi f(z_k)\zeta}$$

where N is the number of keypoints in the image from the environment surrounding the system in the neighborhood of the query point, $z_c$ is the query point represented in complex space, $z_k$ is the $k^{th}$ keypoint, $f(z_k)$ is the feature value of the $k^{th}$ keypoint, and $\zeta$ is the continuous independent variable of the descriptor function $F(\zeta)$, or
the periodic descriptor function is a scale-invariant and rotation-invariant function defined as:

$$F(\zeta) = \frac{1}{z_m}\sum_{k=0}^{N-1}(z_k - z_c)e^{i2\pi f(z_k)\zeta}$$

wherein $$z_m = \frac{1}{N}\sum_{k=0}^{N-1}(z_k - z_c);$$

and
outputting, by the processor, an alert signal via a signal bus if the sample value satisfies an alert condition.

12. The method of claim 11, wherein the alert signal results in haptic feedback to the operator of the system.

13. The method of claim 11, wherein the at least one feature includes a visual appearance feature.

14. The method of claim 11, wherein the at least one feature includes a visual word index in a dictionary of visual words.

* * * * *